(12) United States Patent
Litwiller

(10) Patent No.: US 6,918,094 B2
(45) Date of Patent: Jul. 12, 2005

(54) METHOD TO MODIFY A CURRENT FUNCTION, AT LEAST ONE PARAMETER CURRENT VALUE, OR BOTH, AND A DEVICE ARRANGED IN ACCORDANCE WITH THE METHOD

(75) Inventor: Debora Margaret Hejza Litwiller, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 295 days.

(21) Appl. No.: 10/059,779

(22) Filed: Jan. 30, 2002

(65) Prior Publication Data

US 2003/0142066 A1 Jul. 31, 2003

(51) Int. Cl.$^7$ ................................................. G09G 5/00
(52) U.S. Cl. ........................................ 715/825; 345/173
(58) Field of Search ................................. 345/744, 172, 345/173, 838; 379/354; 348/14.01; 715/526, 825, 826, 827, 828, 829, 841, 845

(56) References Cited

U.S. PATENT DOCUMENTS

| | | | | |
|---|---|---|---|---|
| 5,638,438 A | * | 6/1997 | Keen | ........................... 379/354 |
| 5,724,069 A | * | 3/1998 | Chen | ........................... 345/172 |
| 5,821,926 A | * | 10/1998 | Arita | ........................... 345/744 |
| 5,960,448 A | * | 9/1999 | Reichek et al. | ............. 715/526 |
| 6,396,531 B1 | * | 5/2002 | Gerszberg et al. | ........ 348/14.01 |
| 6,693,652 B1 | * | 2/2004 | Barrus et al. | ................ 345/838 |

* cited by examiner

Primary Examiner—Kent Chang
(74) Attorney, Agent, or Firm—Wayne J. Egan

(57) ABSTRACT

A multi-function device is arranged to perform a plurality of functions. Each function includes a plurality of parameters. Each parameter has a current value from a plurality of parameter allowed values. Each parameter current value is preset to a default value and the device's current function is preset to a primary function. Dedicated user function buttons are provided to modify the device's current function to a desired function as needed for a particular job. Once the desired function is selected, the device is further arranged with dedicated parameter buttons so the user can select one or more parameters and then modify the selected parameters' current values as needed for the job. After running the job with the modified current function and the modified parameter current values, the modified parameters are reset to their default values and the device's current function is reset to the primary function.

3 Claims, 7 Drawing Sheets

METHOD TO MODIFY A CURRENT FUNCTION, AT LEAST ONE PARAMETER CURRENT VALUE, OR BOTH, AND A DEVICE ARRANGED IN ACCORDANCE WITH THE METHOD

FIELD OF THE INVENTION

This application relates to a method to modify a current function and a parameter current value in a multi-function device.

BACKGROUND OF THE INVENTION

Currently standalone devices are being developed to receive and transmit electronic documents in the form of e-mails or internet fax ("i-fax") messages. Because of limited physical space and hardware cost, designers are challenged with how to offer and manage the increased complexity of multiple functionality offered on small devices without sacrificing ease of use to the user.

Having a device user interface that does not have touch screen capability to visually present the information link to selection features further complicates the process.

Notwithstanding the physical space limits on the control panel, user information on status, defaults and feature options still must be displayed and be user-accessible through an obvious and easy-to-use methodology.

In the past, on non-touch screen control panels, a cascade column of LED's with words and/or icons to describe the available options was used as the user scrolled through the selection offered within the feature, i. e., original types, text, mixed, graphics, photo, using a hard-wired button or buttons. On touch screen control panels, users are offered visual feature selections that are activated by touch within the physical constraints of the LCD panel. These visual features may be represented through buttons, tabs or other means.

When a multi-function device is not supported by traditional input/output devices such as a touch-screen display unit, hard-wired buttons and LED cascades, a solution is therefore needed to present the information or control functions by another method.

DETAILED DESCRIPTION OF THE INVENTION

Figure 1:
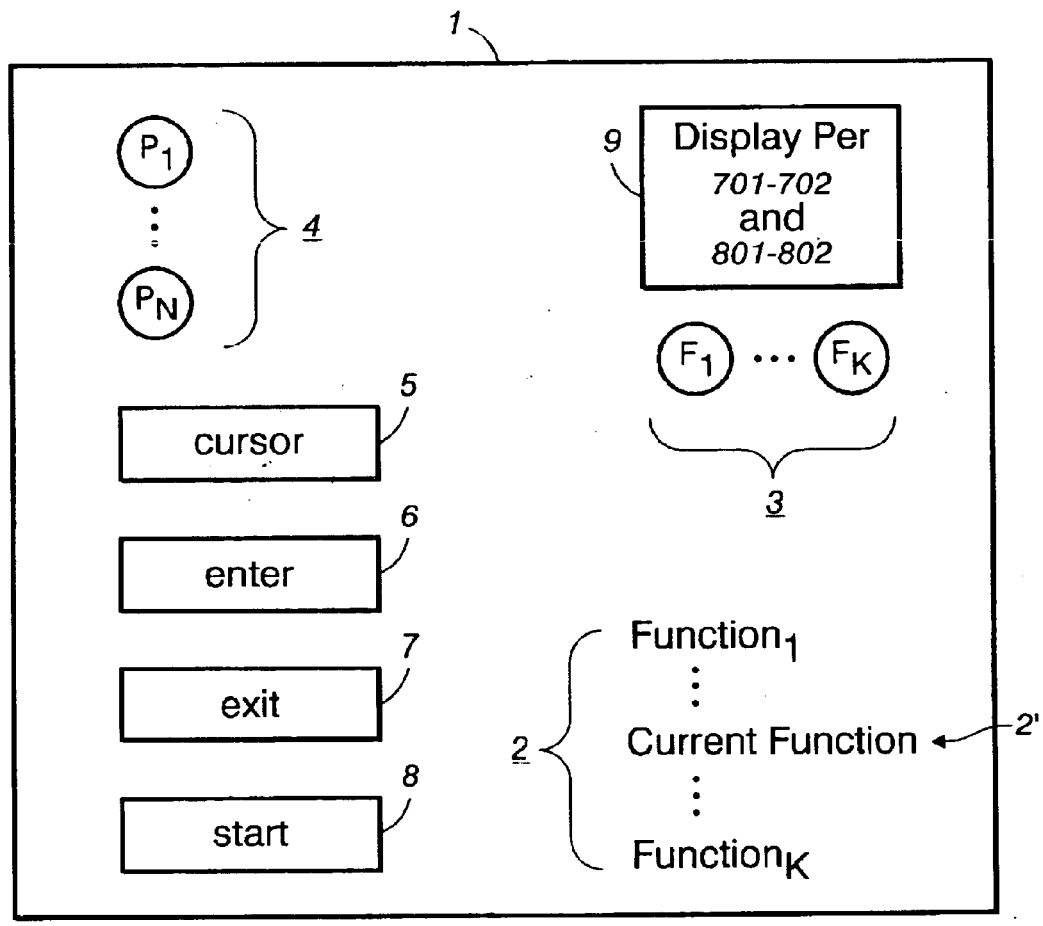
FIG. 1 depicts a device 1 that does not have touch screen capability arranged for performing plural functions 2 including a current function 2', the device including plural non-touch screen function buttons 3 with a non-touch screen function button dedicated for each function, plural non-touch screen parameter buttons 4 with a non-touch screen parameter button dedicated for each parameter, non-touch screen cursor control 5, non-touch screen enter button 6, non-touch screen exit button 7, non-touch screen start button 8 and non-touch screen display unit 9.

Referring to FIG. 1, briefly, a multi-function device 1 that does not have touch screen capability is arranged to perform a plurality of functions, such functions including FAX, internet fax or "I-FAX", E-MAIL, PRINT, COPY and SCAN.

Each of the plural functions includes a plurality of features or, as used herein, "parameters", such parameters including the following five parameters: RESOLUTION, OUTPUT, LIGHTEN/DARKEN, REDUCE/ENLARGE and PAPER SUPPLY.

In turn, each parameter has a current setting or, as used herein, "value", that is one of a plurality of corresponding parameter allowed values.

For example, the first parameter RESOLUTION may have allowed numerical values from 1-N, or alpha-numeric values such as "standard", "fine", "super fine", etc.

Also, the second parameter OUTPUT may have allowed values of "collated", "non-collated", "stapled", "non-stapled", "stapled and collated", "stapled and non-collated", non-stapled and collated", and "non-stapled and non-collated", etc.

Further, the third parameter LIGHTEN/DARKEN may have allowed numerical values from –(minus) M to +(plus) M, etc.

Too, the fourth parameter REDUCE/ENLARGE may have allowed numerical values from 10% to 400%, etc.

Finally, the fifth parameter PAPER SUPPLY may have allowed values of 8.5×11 inches, A4 size, 8×14 inches, 11×17 inches, etc.

Before any jobs are run, the device 1 is initialized as follows: First, each parameter's current value is preset to a user-defined "default value". And, second, the device 1's current function is preset to a user-defined "primary" function.

The device 1 is arranged with dedicated non-touch screen function buttons and dedicated non-touch screen parameter buttons. By operating these dedicated non-touch screen function and parameter buttons, a user customizes the device 1 for a particular job. This customizing process is described as follows. First, a device 1 user operates the dedicated non-touch screen function buttons to modify the device 1's current function to whatever desired function is needed for the current job. Second, once the desired device 1 function is selected, the device 1 user operates the dedicated non-touch screen parameter buttons to select those parameters whose current values must be modified for the current job. Once the selected parameters are identified, the user next modifies the selected parameters' current values to whatever parameter values are needed for the current job. As a result of this process, the device 1 is now customized for the current job.

The device 1 then runs the current job using the modified current function and the modified parameter current values.

When the current job run is complete, the device 1 then resets all modified parameters to their pre-job default values, and the device 1 resets the current function to the pre-job primary function.

Referring still to FIG. 1, there is shown the multi-function device 1 arranged for performing a plurality of functions 2, the plurality of functions 2 including a current function 2'.

The device 1 includes a plurality of non-touch screen function buttons 3, the plurality of function buttons 3 including a non-touch screen function button dedicated for each individual function 2.

The device 1 also includes a plurality of non-touch screen parameter buttons 4, the plurality of parameter buttons 4 including a non-touch screen parameter button dedicated for each individual parameter.

The device 1 also includes a non-touch screen enter button 6, non-touch screen exit button 7, non-touch screen start button 8 and non-touch screen display unit 9.

In one embodiment, the display unit 9 includes a cursor arranged to be controlled by a non-touch screen cursor control 5.

In one embodiment, the non-touch screen cursor control 5 comprises a 4-way cursor control, with 4 non-touch screen buttons for moving a display cursor in the up, down, left and right directions.

Before any jobs are run, the device 1 is initialized by setting each parameter's current value is preset to a user-defined "default value" and by setting the device 1's current function is preset to a user-defined "primary" function.

In one embodiment, the initializing is performed before the device 1 is acquired by the user. For instance, the initializing may be done by the manufacturer or distributor.

In another embodiment, the initializing is performed by the device 1's user.

Figure 2:
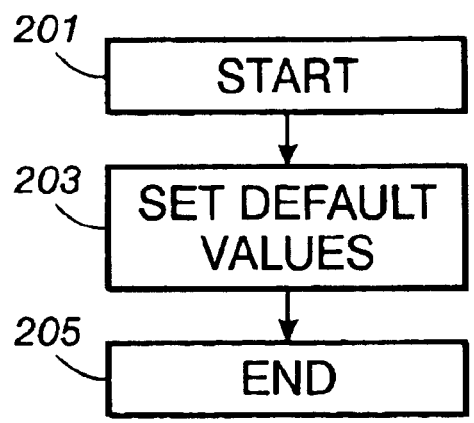
FIG. 2 is a first embodiment of a flow diagram to set parameter default values in the FIG. 1 device.
Figure 3:
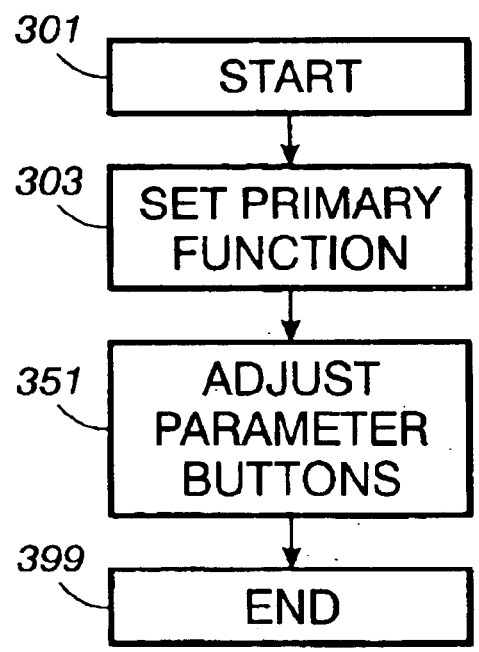
FIG. 3 is a first embodiment of a flow diagram to set a primary function in the FIG. 1 device.

FIGS. 2–3 depict the initializing process for the device 1.

Referring now to FIG. 2, there is depicted a first embodiment of a flow diagram to set parameter default values in the device 1, as in step 203.

In one embodiment, for example, the plural parameters are initialized as follows:

The RESOLUTION parameter is set to the default value of standard.

The OUTPUT parameter is set to the default value of stapled and collated.

The LIGHTEN/DARKEN parameter is set to the default value of +3.

The REDUCE/ENLARGE parameter is set to the default value of 100%.

The PAPER SUPPLY parameter is set to the default value of 8.5×11 inches.

Referring now to FIG. 3, there is depicted a first embodiment of a flow diagram for the user to set a primary function in the device 1.

In step 303, the primary function is set.

In one embodiment, for example, step 303 sets the primary function to FAX.

In another embodiment, step 303 sets the primary function to COPY.

In step 351, all dedicated non-touch screen parameter buttons 4 are adjusted based on the primary function set in step 303. Thus, the dedicated non-touch screen parameter buttons 4 that are appropriate to the primary function are enabled and the remaining non-touch screen parameter buttons 4 that are not appropriate to the primary function are disabled.

As an example, for a primary function of FAX the RESOLUTION parameter is appropriate and so its dedicated non-touch screen parameter button is enabled, but the OUTPUT parameter is not appropriate and so its dedicated non-touch screen parameter button is disabled.

Figure 4:
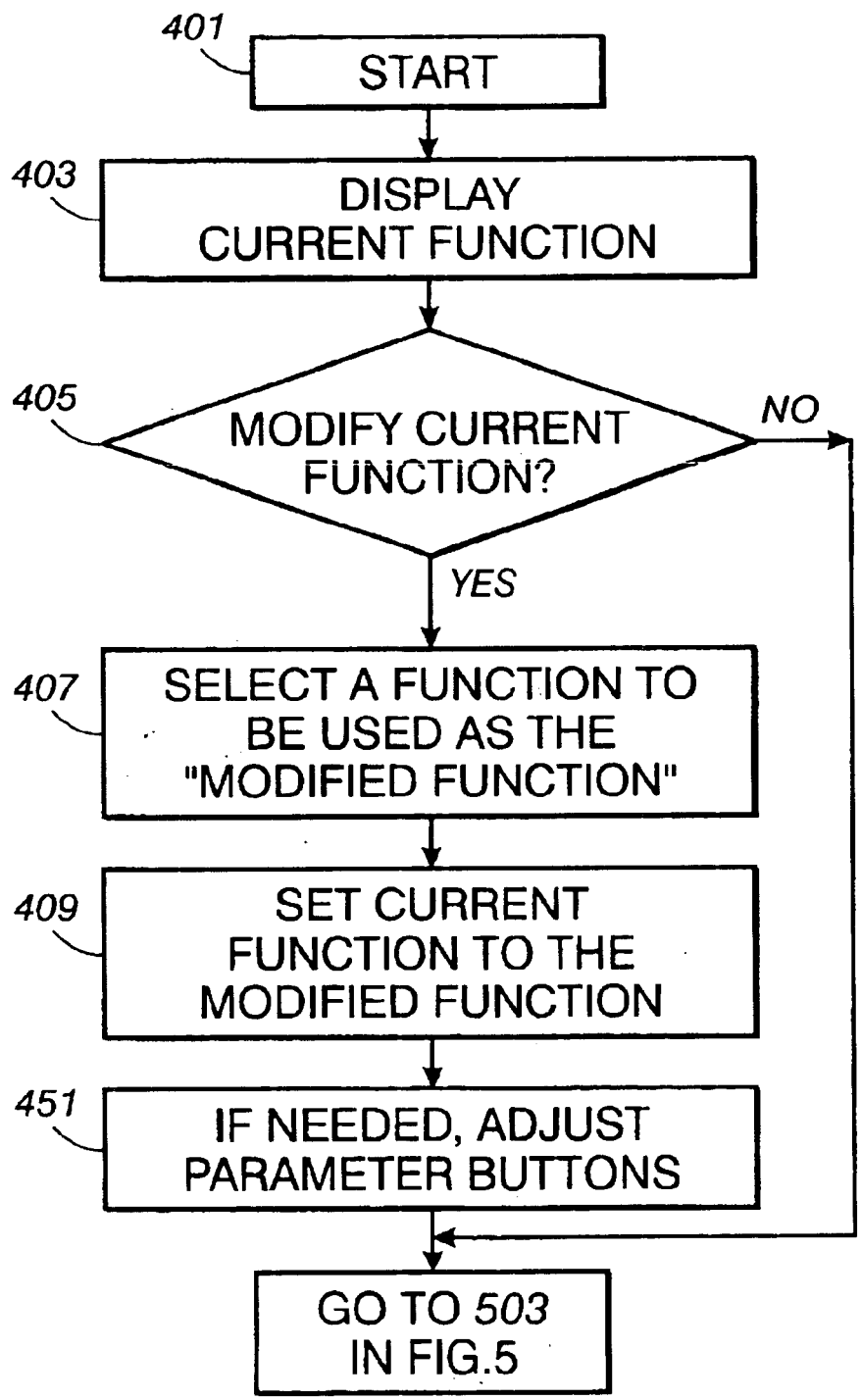
FIG. 4 is a first embodiment of a flow diagram to modify the current function 2' in the FIG. 1 device.

FIG. 4 is a first embodiment of a flow diagram to modify the current function 2' in the device 1.

Figure 5:
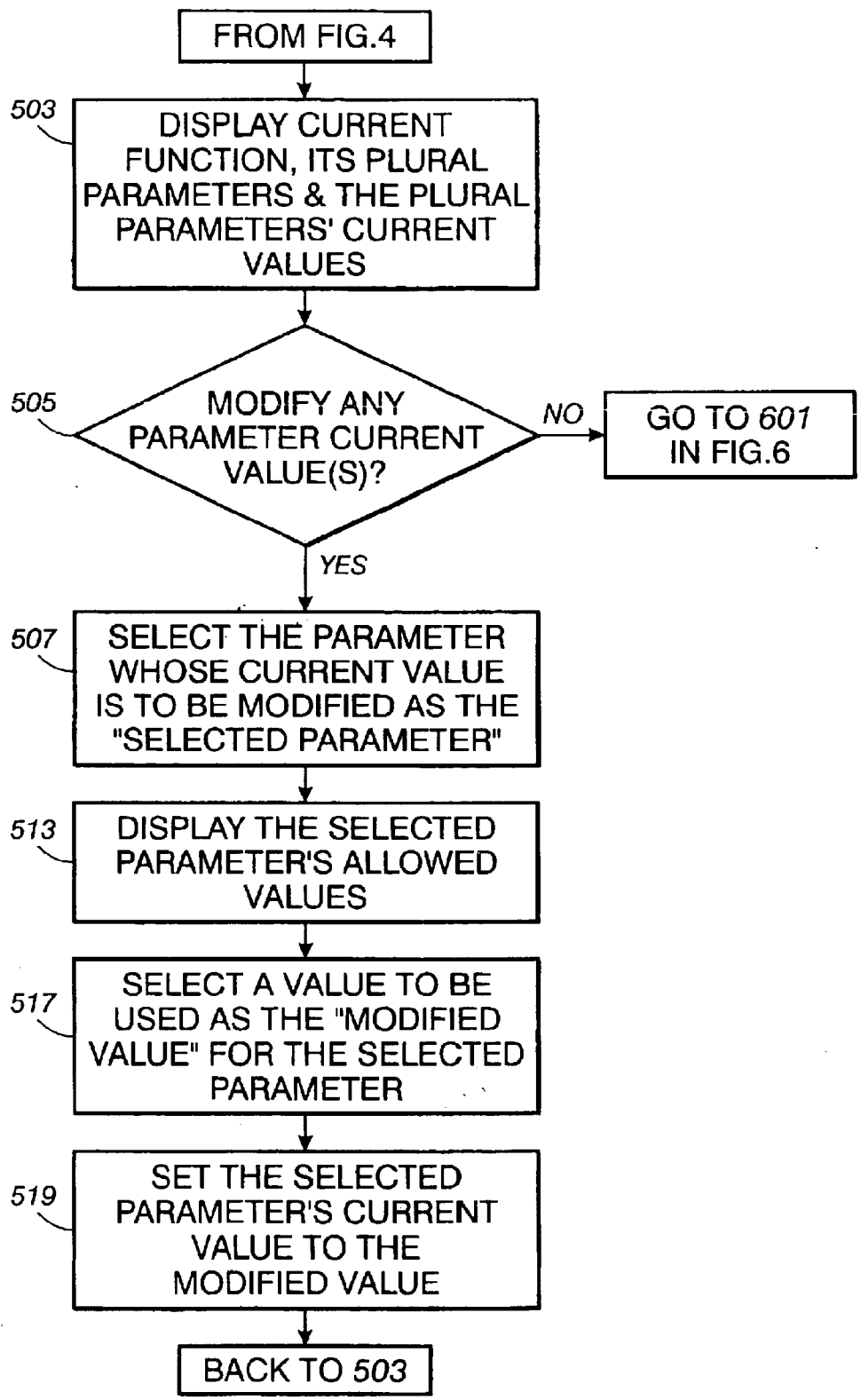
FIG. 5 is a first embodiment of a flow diagram to modify at least one parameter current value in the FIG. 1 device.

FIG. 5 is a first embodiment of a flow diagram to modify at least one parameter current value in the device 1.

Figure 6:
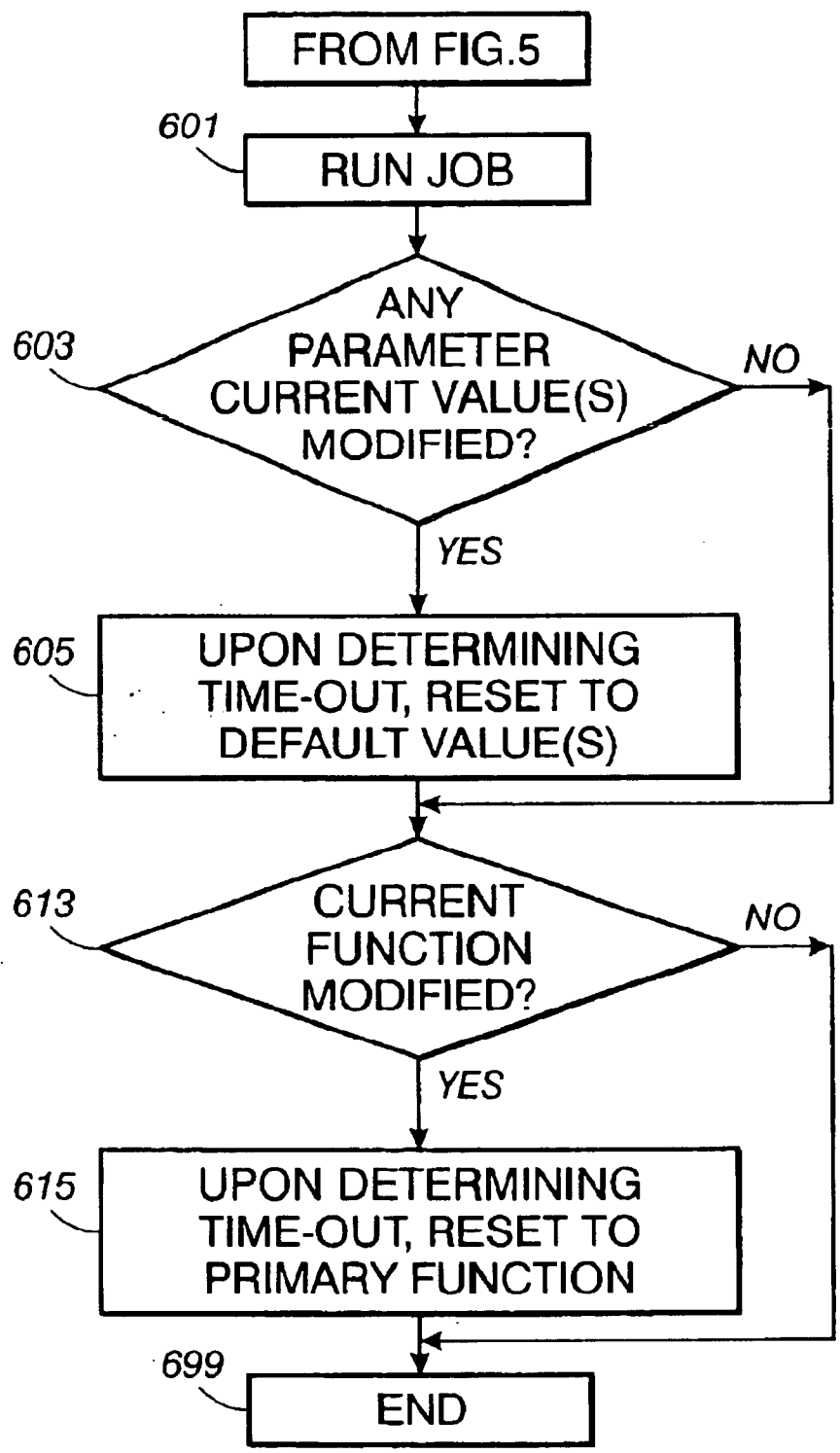
FIG. 6 is a first embodiment of a flow diagram for the FIG. 1 device to run a job using the modified current function 2' and, when the job run is complete, first, to reset all modified parameters to their corresponding pre-job default values and, second, to reset the current function 2' to its corresponding pre-job primary function.

FIG. 6 is a first embodiment of a flow diagram for the device 1 to run a job using the modified current function 2' and, when the job run is complete, first, to reset all modified parameters to their corresponding pre-job default values and, second, to reset the current function 2' to its corresponding pre-job primary function.

The device 1 process as depicted in FIGS. 4–6 starts at step 401 of FIG. 4.

Referring now to FIG. 4, in step 401 the device 1 has previously been initialized as described in connection with in the above FIGS. 2–3. As a result, all parameter values are preset to their default values and the current function 2' is preset to the primary function.

After step 401, the process goes to step 403.

In step 403, the display 9 displays the current function 2'. The process then goes to step 405.

In step 405, the user determines whether it is necessary to modify the current function 2' for the current job. For example, if the current function 2' is FAX and the current job also is FAX, it is not necessary to modify the current function 2, and so the determining step 405 result will be negative or "no". In contrast, if the current function 2' is FAX and the current job is COPY, it is necessary to modify the current function 2', and so the determining step 405 result will be positive or "yes".

If the result from the user determining step 405 is negative or "no", the process goes to step 503 of FIG. 5.

Otherwise, if the result from the user determining step 405 is positive or "yes", the process goes to step 407.

In step 407, the user selects a particular function from the plurality of functions 2 to use as a modified function for the current job. There are several ways to do this.

In one embodiment, step 407 includes a step, by the user, of operating the non-touch screen function button 3 dedicated to the function selected by the user to use as the modified function. The function corresponding to the dedicated non-touch screen function button 3 that is operated by the user is thus selected as the device 1's modified function for the current job.

For example, to select the COPY function as the modified function, the user operates the non-touch screen function button 3 dedicated to the COPY function.

In another embodiment, the display unit 9 displays the plurality of functions 2 together with a display pointer. In this latter embodiment, step 407 includes a step, by the user, of operating the non-touch screen cursor control 5 to cause the display pointer to "point" to and thus indicate a particular displayed function. The function indicated by the pointer is thus selected as the device 1's modified function for the current job.

After step 407, the process goes to step 409.

In step 409, the device 1 sets the current function 2' to the modified function that was selected in step 407. For example, if step 407 selects the COPY function as the modified function, then the device step 409 sets the current function 2' to the COPY function. The process then goes to step 451.

In step 451, if needed, the device 1 adjusts one or more non-touch screen parameter buttons 4 based on the new current function 2' that in step 409 has been set to the modified function. Thus, in step 451, similar to the above step 351, the device 1 enables those dedicated non-touch screen parameter buttons 4 that now are appropriate to the current function 2' that in step 409 has been set to the modified function and disables the remaining non-touch screen parameter buttons 4 that now are not appropriate to the current function 2' that in step 409 has been set to the modified function.

In one embodiment, the primary function's appropriate parameters are identical to the modified function's appropriate parameters, and thus no parameter button adjustment is needed in step 451.

After step 451, the process goes to step 503 of FIG. 5.

Figure 7A:
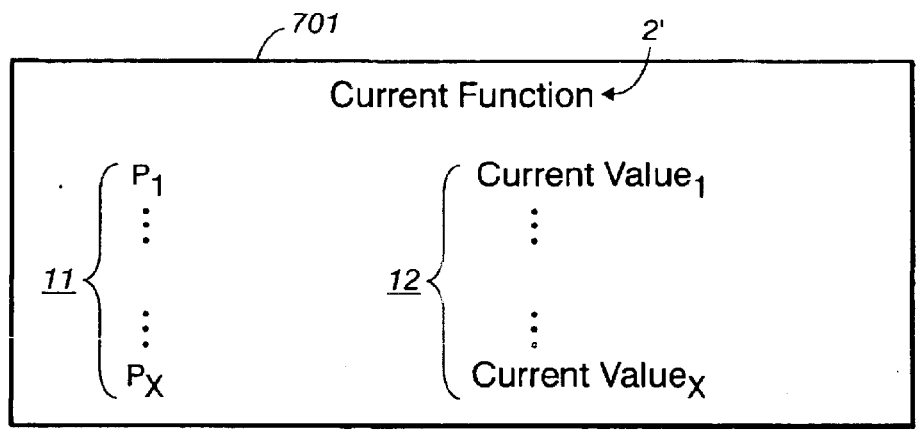
FIGS. 7A–7B depict several displays 701–702 for the non-touch screen display unit 9 in the FIG. 1 device.

Referring now to FIG. 5, In step 503, the device 1 display unit 9 provides a non-touch screen display 701 as shown in FIG. 7A. As shown in FIG. 7A, the display 701 includes the current function 2' together with the current function's plurality of parameters 11 and their plural corresponding current values 12. Still referring to the FIG. 7A display 701, it will be understood that the number of parameters displayed, as depicted by the reference letters P1 through PX, wilt depend on the current function 2'. Also, it will be understood that for each displayed parameter 11, its corresponding displayed current value 12 is equal to the default value as set in step 203. Therefore, in step 503 the device 1 displays, as depicted in the FIG. 7A display 701, the current or default values for all parameters pertaining to the current function 2'. The process then goes to step 505.

Still referring to FIG. 5, in step 505 the user determines whether to modify any of the current parameter values 12 in the display 701 for the current job.

If the result from the user determining step 505 is negative or "no", the process goes to step 601 of FIG. 6.

Otherwise, if the result from the user determining step 505 is positive or "yes", the process goes to step 507.

In step 507, from the display 701's plurality of parameters 11 and their corresponding current values 12, the user selects a particular parameter whose corresponding current value is to be modified for the current job.

It will be understood that step 507 comprises the user, first, mentally selecting a particular parameter whose current value is to be modified and, second, indicating to the device 1 the identity of the parameter so selected. This is described below.

In step 507, the user mentally selects the particular parameter 11 in the display 701 corresponding to the current value 12 that the user wants to modify. In the related display 702 of FIG. 7B, the parameter so selected is depicted by reference number 11' and its corresponding parameter current value by reference number 12'.

Upon mentally selecting the parameter 11' whose current value 12' is to be modified, there are several ways to indicate the identify of parameter 11' to the device 1.

Figure 7B:
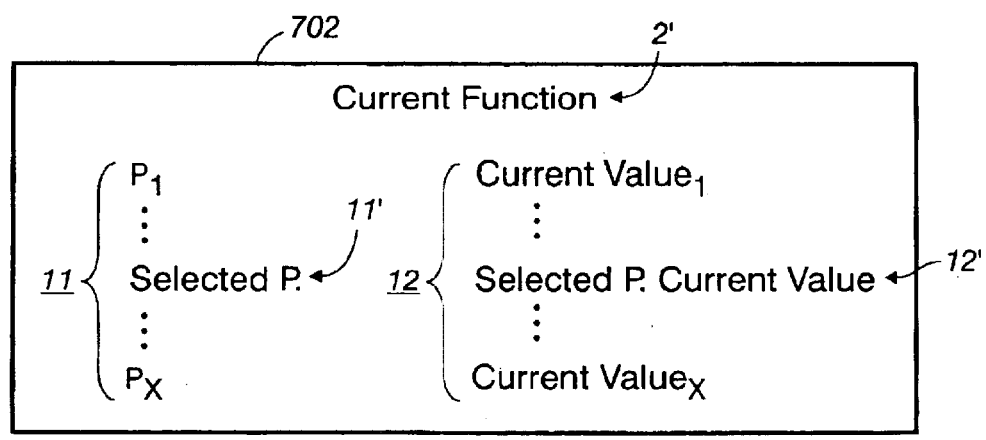

Referring to the display 702 depicted in FIG. 7B, in one embodiment the user operates the non-touch screen parameter button 4 dedicated to the selected parameter 11', thus indicating to the device 1 that the user wants to modify the corresponding selected parameter current value 12'.

In another embodiment, the display unit 9 displays the plural parameters 11 and their corresponding parameter current values 12 together with a display pointer. In this latter embodiment, the user operates the non-touch screen cursor control 5 to cause the display pointer to move so as to "point" to the selected parameter 11' to indicate to the device 1 that the user wants to modify the corresponding selected parameter current value 12'.

To summarize, in step 507 the user selects the displayed parameter 11' whose corresponding displayed current value 12' the user desires to modify for the current job, the parameter so selected being referred to below as the "selected parameter".

After step 507, the process goes to step 513.

Figure 8A:
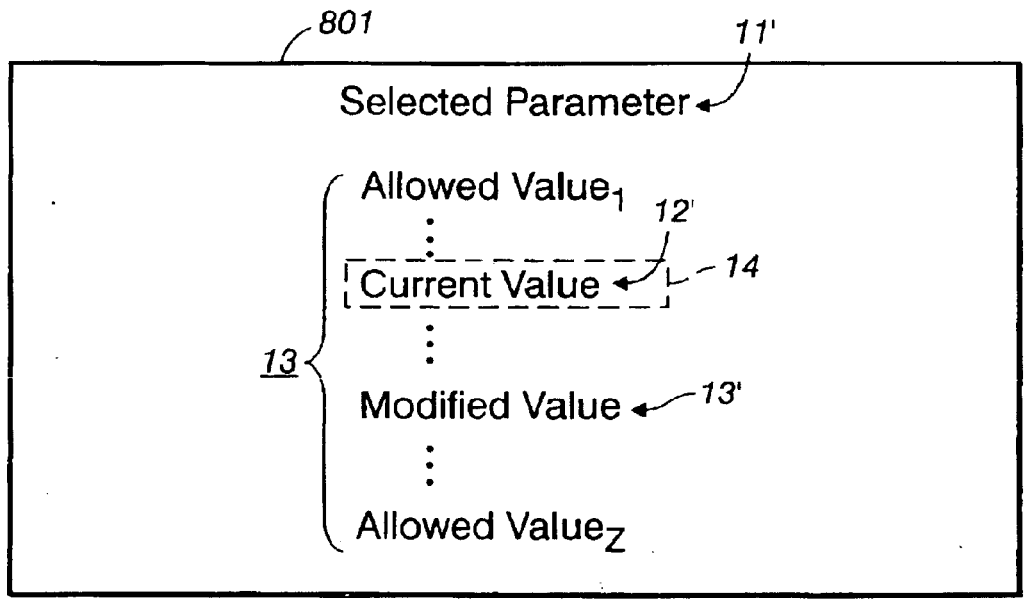
FIGS. 8A–8B depict further displays 801–802 for the non-touch screen display unit 9 In the FIG. 1 device.

In step 513, the device 1 by means of the display unit 9 provides a further display 801 as depicted in FIG. 8A of the selected parameter 11' together with the selected parameter 11's corresponding plurality of parameter allowed values. Referring now to display 801, the selected parameter 11's plurality of allowed values is collectively depicted by the reference number 13. The displayed plurality of allowed values 13 of course includes the selected parameter 11's current value 12', which current value 12' is visually indicated by a display pointer 14.

After step 513, the process goes to step 517.

In step 517, from amongst the plurality of allowed values 13 in the display 801, the user selects a particular value to be used as the current value for the selected parameter 11' in the current job.

Similar to step 507 above, the step 517 comprises the user, first, mentally selecting a particular allowed value to be used for the selected parameter 11' in the current job and, second, indicating to the device 1 the identity of the allowed value so selected. This is described below.

In step 517, the user mentally selects a particular allowed value 13' in the display 801 that the user wants to use for the current value of the selected parameter in the current job. This selected value 13' is referred to below as the "modified value".

Figure 8B:
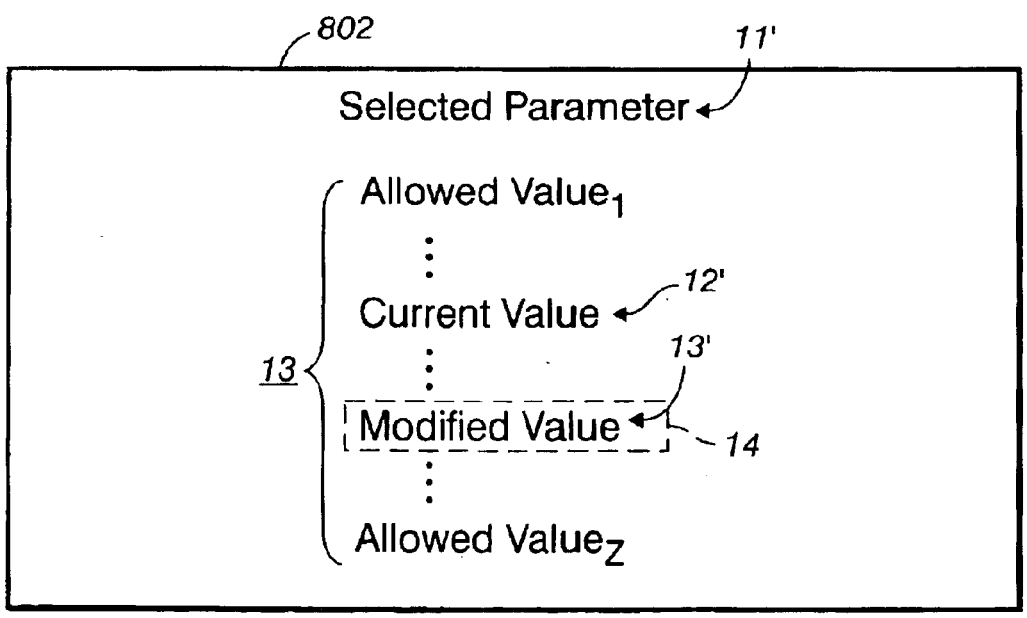

Upon mentally selecting the modified value 13' to be used, the user next physically causes the display pointer 14 to move, scroll or position in such a manner as to "point" to the modified value 13' to thus identify the modified value 13' to the device 1 as depicted in the related display 802 of FIG. 8B. There are several ways for the user to cause the display pointer 14 to move in the desired manner to result in the pointer 14 finally pointing to the modified value 13' as shown in the display 802.

In one embodiment, the user again operates the non-touch screen parameter button 4 that is dedicated to the selected parameter 11' to cause the display pointer 14 to scroll, move or position as desired. In this embodiment, the pointer 14 scrolls or moves successively from one allowed value to the next allowed value in response to the users operation of the corresponding dedicated parameter button 4.

In another embodiment, the user operates the cursor control 5 to cause the display pointer 14 to move in the desired manner.

To summarize, in step 517 the user selects the modified value 13' to be used as the selected parameter's current value in the current job.

After step 517, the process goes to step 519.

In step 519, the device 1 sets the selected parameter's current value to the modified value to form a selected parameter modified value. The process next returns to step 503.

In step 503, the device 1 again displays the current function 2', together with its plural parameters 11, and the plural parameters' current values 12, the current values 12 reflecting any parameter values that have been modified as a result of step 519. The process then goes to step 505, where the user determines if he or she wants to modify any further parameter current values. The parameter modification process thus continues until the user determines, at step 505, that the parameter current value modification process is complete. At this point, the result from the user determining step 505 will be negative or "no", and the process goes to step 601 of FIG. 6.

Referring now to FIG. 6, in step 601 the device 1 runs the current job using the current function 2' that has been modified as a result of the steps 401 through 451 as depicted in FIG. 4 and further using the at least one parameter current value that has been modified as a result of the steps 503 through 519 as depicted in FIG. 5. After the current job run is complete, the process goes to step 603.

In step 603 the device 1 determines if one or more parameter current values have been modified.

If the result from the device determining step 603 is negative or "no", the process goes to step 613.

Otherwise, if the result from the device determining step 603 is positive or "yes", the process goes to step 605.

In step 605, the device 1 determines a fixed time-out period of further inactivity by the user. Thus, the device 1 determines whether the user wants to run further jobs using the current function 2' and parameter current values. If the user presents further jobs, the device 1 runs these jobs with its current function 2' and parameter current values. However, upon the elapse of a fixed time period during which the user fails to run more jobs, the device 1 times out, whereupon the device 1 resets all parameter current values to their corresponding original (pre-modification) default values. The process then goes to step 613.

In step 613 the device 1 determines if the current function 2' has been modified.

If the result from the device determining step 613 is negative or "no", the process goes to step 699.

Otherwise, if the result from the device determining step 613 is positive or "yes", the process goes to step 615.

In step 615, the device 1 determines a fixed time-out period of further inactivity by the user. Thus, the device 1 determines whether the user wants to run further jobs using the current function 2' and parameter current values. If the user presents further jobs, the device 1 runs these jobs with its current function 2' and parameter current values. However, upon the elapse of a fixed time period during which the user fails to run more jobs, the device 1 times out, whereupon the device 1 resets the current function 2' to the original (pre-modification) primary function. The process then goes to step 699.

In step 699, the process ends.

While various embodiments of a method to modify a current function, at least one parameter current value, or both, and a device arranged in accordance with the method, in accordance with the present invention, have been described hereinabove, the scope of the invention is defined by the following claims.

What is claimed is:

1. A multi-function device arranged for performing plural functions, wherein the plural functions comprise fax, internet fax, email, print, copy and scan, the plural functions including a current function, the current function having plural parameters, wherein the plural parameters comprise resolution, output, lighten/darken, reduce/enlarge and paper supply, each parameter of the plural parameters having a corresponding parameter current value that is one of a plurality of parameter allowed values corresponding to the each parameter, the multi-function device comprising a display unit, the multi-function device arranged to modify a parameter current value in accordance with a method comprising the steps of:

(a) by the multi-function device display unit, providing a display, the display including the current function together with the current function's plurality of parameters and their plural corresponding current values;

(b) by a user of the multi-function device, from the displays plurality of parameters and their plural corresponding current values, selecting a particular parameter whose corresponding current value is to be modified, thus forming a selected parameter and a corresponding selected parameter current value;

(c) by the multi-function device display unit, providing a further display of the selected parameter together with the selected parameter's corresponding plurality of parameter allowed values, the plurality of parameter allowed values including the selected parameter current value;

(d) by the user, from amongst the plurality of parameter allowed values in the further display, selecting a particular value to be used as the current value for the selected parameter, such particular value to be used referred to as a modified value; and (e) by the multi-function device, setting the selected parameter current value to the modified value.

2. The multi-function device of claim 1, the multi-function device further comprising a cursor control; in the display providing step (a), the display further including a display pointer; the parameter user selecting step (b) being performed by means of operating the cursor control to cause the display pointer to move so as to point to the selected parameter; in the further display providing step (c), the current value being indicated in the further display by a further display pointer; and the user selecting step (d) being performed by means of operating the cursor control to cause the further display pointer to point to the modified value.

3. The multi-function device of claim 2, wherein the cursor control comprises a four (4)-way cursor control, with four (4) buttons for moving a display cursor in the up, down, left and right directions.

\* \* \* \* \*